US010350537B2

United States Patent
Sundaram et al.

(10) Patent No.: US 10,350,537 B2
(45) Date of Patent: Jul. 16, 2019

(54) HIGH PURITY NITROGEN/HYDROGEN PRODUCTION FROM AN EXHAUST STREAM

(71) Applicant: ExxonMobil Research and Engineering Company, Annandale, NJ (US)

(72) Inventors: Narasimhan Sundaram, Annandale, NJ (US); Hans Thomann, Bedminster, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 173 days.

(21) Appl. No.: 15/653,806

(22) Filed: Jul. 19, 2017

(65) Prior Publication Data

US 2018/0036670 A1  Feb. 8, 2018

Related U.S. Application Data

(60) Provisional application No. 62/370,876, filed on Aug. 4, 2016.

(51) Int. Cl.
*B01D 53/047* (2006.01)
*C01B 32/50* (2017.01)
(Continued)

(52) U.S. Cl.
CPC ....... *B01D 53/047* (2013.01); *B01D 53/0407* (2013.01); *B01D 53/62* (2013.01);
(Continued)

(58) Field of Classification Search
CPC .......... B01D 53/047; B01D 2257/102; B01D 2257/504; B01D 2256/16;
(Continued)

(56) References Cited

U.S. PATENT DOCUMENTS

| 5,989,316 A | 11/1999 | Kuznicki et al. |
| 6,068,682 A | 5/2000 | Kuznicki et al. |

(Continued)

FOREIGN PATENT DOCUMENTS

| EP | 383312 A2 | 8/1990 |
| EP | 2220338 B1 | 8/2010 |

(Continued)

OTHER PUBLICATIONS

The International Search Report and Written Opinion of PCT/US2017/042758 dated Jul. 19, 2017.
(Continued)

*Primary Examiner* — Thuan D Dang
(74) *Attorney, Agent, or Firm* — Priya G. Prasad; Andrew T. Ward

(57) ABSTRACT

Methods are provided for the production of nitrogen, hydrogen, and carbon dioxide from an exhaust gas. Exhaust gas from combustion in a fuel rich (or reducing) atmosphere is primarily composed of $CO_2$, $CO$, $N_2$, $H_2O$, and $H_2$. $CO$ may be converted to $CO_2$ and $H_2$ via the water gas shift reaction. Carbon dioxide may then be effectively separated from nitrogen and hydrogen to produce a carbon dioxide stream and a nitrogen/hydrogen stream. The nitrogen/hydrogen stream may then be effectively separated to produce a high purity nitrogen stream and a high purity hydrogen stream. The process may be done in any order, such as separating the nitrogen first or the carbon dioxide first.

11 Claims, 3 Drawing Sheets

(51) Int. Cl.
*B01D 53/04* (2006.01)
*C01B 3/56* (2006.01)
*C01B 21/04* (2006.01)
*F01N 3/08* (2006.01)
*B01D 53/62* (2006.01)

(52) U.S. Cl.
CPC ............ *C01B 3/56* (2013.01); *C01B 21/0466* (2013.01); *C01B 32/50* (2017.08); *F01N 3/0842* (2013.01); *F01N 3/0857* (2013.01); *F01N 3/0871* (2013.01); *B01D 2253/108* (2013.01); *B01D 2253/112* (2013.01); *B01D 2253/1124* (2013.01); *B01D 2256/10* (2013.01); *B01D 2256/16* (2013.01); *B01D 2256/22* (2013.01); *B01D 2257/102* (2013.01); *B01D 2257/504* (2013.01); *B01D 2259/402* (2013.01); *B01D 2259/4006* (2013.01); *B01D 2259/40056* (2013.01); *C01B 2203/042* (2013.01); *C01B 2203/043* (2013.01); *C01B 2203/0465* (2013.01); *C01B 2203/0475* (2013.01); *C01B 2203/146* (2013.01); *Y02C 10/08* (2013.01)

(58) Field of Classification Search
CPC .. B01D 2259/40086; B01D 2259/4145; B01D 2259/403; B01D 53/0407; B01D 53/0473; B01D 53/0476; B01D 2259/404; C01B 3/56; C01B 2203/043; C01B 2203/0475; C01B 2203/0465; C01B 2203/146; C01B 21/0466; C01B 21/0045; C01B 21/0455
USPC .................................. 95/96, 130, 139, 97, 98
See application file for complete search history.

(56) References Cited

U.S. PATENT DOCUMENTS

| | | | |
|---|---|---|---|
| 6,902,602 | B2 | 6/2005 | Keefer et al. |
| 8,262,773 | B2 | 9/2012 | Northrop et al. |
| 9,476,356 | B2 | 10/2016 | Sundaram et al. |
| 2012/0125194 | A1 | 5/2012 | Caram et al. |
| 2012/0318533 | A1 | 12/2012 | Keller et al. |
| 2013/0333391 | A1 | 12/2013 | Sundaram et al. |
| 2014/0230445 | A1 | 8/2014 | Huntington |
| 2016/0009563 | A1 | 1/2016 | Corma Canos et al. |
| 2017/0009652 | A1 | 1/2017 | Sundaram et al. |

FOREIGN PATENT DOCUMENTS

| | | |
|---|---|---|
| WO | 2012/003079 A1 | 1/2012 |
| WO | 2017/087154 A1 | 5/2017 |
| WO | 2017/087164 A1 | 5/2017 |
| WO | 2017/087167 A1 | 5/2017 |

OTHER PUBLICATIONS

Reijers, "Modeling Study of the Sorption-Enhanced Reaction Process for CO2 Capture. I. Model Development and Validation", Ind. Eng. Chem. Res., 2009, 6966-6974, 48.

Wright, "CAESAR: Development of a SEWGS model for IGCC", Energy Procedia 4 (2011) 1147-1154.

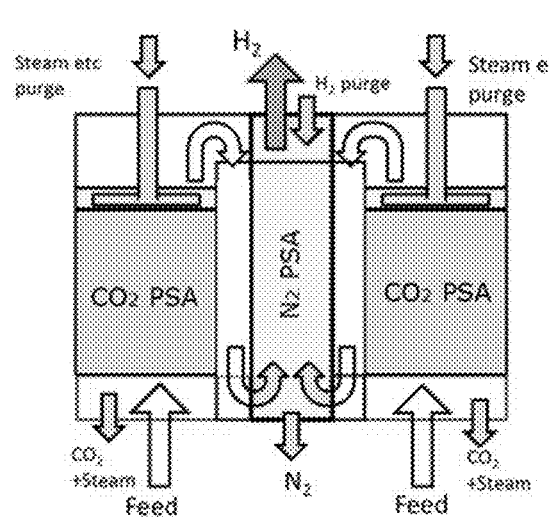 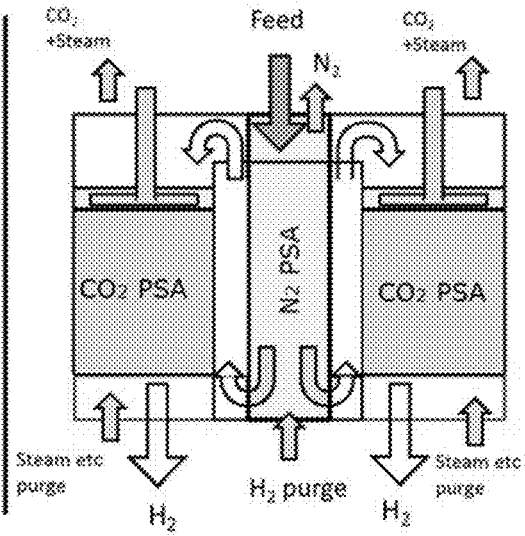
Figure 4a  Figure 4b
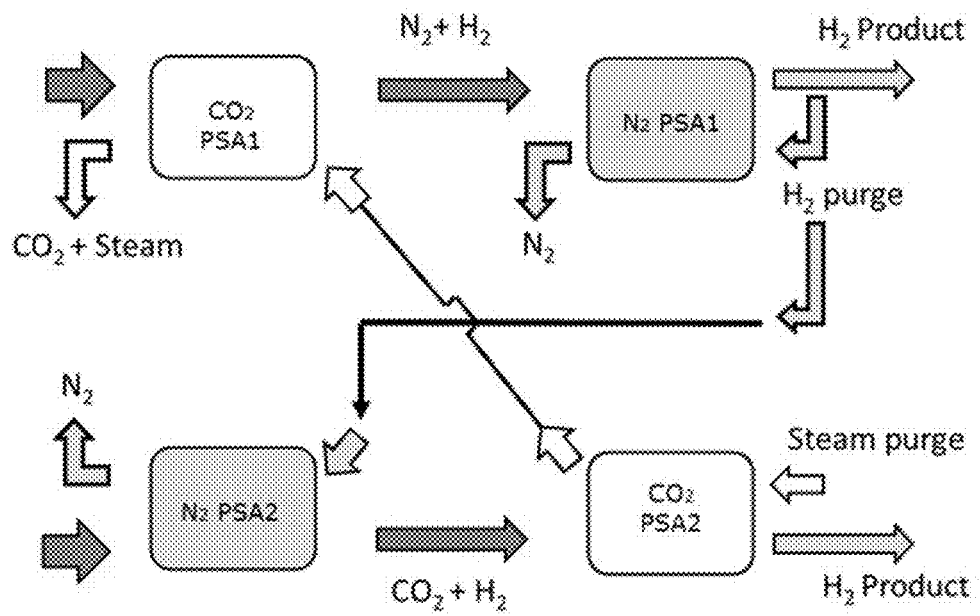
Figure 5

HIGH PURITY NITROGEN/HYDROGEN PRODUCTION FROM AN EXHAUST STREAM

CROSS-REFERENCE TO RELATED APPLICATIONS

This application claims the benefit of U.S. Provisional Application No. 62/370,876, filed on Aug. 4, 2016, the entire contents of which are incorporated herein by reference.

FIELD

In various aspects, the invention is related to low emission power production with separation and/or capture of resulting emissions.

BACKGROUND

Capture of gases emitted from power plants is an area of increasing interest. Power plants based on the combustion of petroleum products generate carbon dioxide as a by-product of the reaction. Historically this carbon dioxide has been released into the atmosphere after combustion. However, it is becoming increasingly desirable to identify ways to find alternative uses for the carbon dioxide generated during combustion.

Combined cycle power plants provide an efficient way to generate electricity from the burning of petroleum products or other carbon-based fuels. Combined cycle power plants can leverage an initial combustion reaction to power multiple turbines for generation of electricity, leading to more efficient power generation. However, conventional methods for capturing carbon dioxide tend to reduce the efficiency of electricity generation, due to the additional energy required to capture and/or sequester the carbon dioxide.

PCT International Publication No. WO/2012/003079 describes systems and methods for generating electricity using a combined cycle power plant based on combustion of carbon-based fuels. The systems and methods include use of stoichiometric ratios of fuels to oxygen in the combustion reaction as well as recycling of combustion exhaust gas as part of the input to the combustion reaction. The combustion products are withdrawn from the system as a purge gas stream. The $CO_2$ in the purge gas stream is removed, for example, using a solvent such as potassium carbonate.

U.S. Pat. No. 6,902,602 describes methods for performing separations by swing adsorption where it is desirable to minimize or avoid interaction between one of the components in a gas stream being separated and a component of the gas stream used for purging the swing adsorption apparatus. Separations of hydrogen and carbon dioxide from syngas stream are noted as an example, where it is desirable to avoid contamination of the hydrogen product stream with any oxygen from the typical oxygen-containing purge stream. The separation methods include use of one or more buffer gas steps during a separation, where a buffer different from any other components is used to prevent contamination between steps of a separation process.

U.S. Published Patent Application No. 2012/0125194 describes an autothermal cycle for $CO_2$ capture. A combustion exhaust gas is contacted with an adsorbent bed to adsorb $CO_2$. The $CO_2$ is then removed by contacting the adsorbent with a gas comprising steam. The resulting output gas containing steam and $CO_2$ is conveyed to a vapor recompression system to recover $H_2O$, $CO_2$, and heat. The recovered $H_2O$ and heat are then used to provide steam for the sweep gas. The amount of steam sweep gas required for recovery of $CO_2$ is described as being ~1 mole of steam per mole of input feed gas. The flue gas input feeds are described as having a $CO_2$ content of 15 mol % or less. Thus, the steam/$CO_2$ molar ratio is described as being at least ~6 moles of steam per mole of $CO_2$. The process is described as recovering at least 90% of the carbon in the combustion exhaust gas as part of the output gas.

Other potentially relevant publications can include U.S. Patent Application Publication No. 20120318533, European Patent Application No. EP 2220338, an article by Reijers et al., *Ind. Eng. Chem. Res.*, 2009, 48, 6966, and an article by Wright et al., *Energy Procedia*, 2011, 4, 1457, inter alia.

SUMMARY

In various aspects, methods are provided for production of $H_2$, $N_2$, and $CO_2$ from an exhaust stream. In one aspect, the method includes passing an exhaust stream comprising at least about 40-80 vol % $N_2$, at least about 5-30 vol % $CO_2$, and at least about 1-20% $H_2$ into a $CO_2$ swing adsorption reactor comprising a $CO_2$ adsorbent material selective for $CO_2$ over $N_2$ and $H_2$, the exhaust stream having a pressure between about 10 bara (about 1.0 MPaa) to about 30 bara (about 3.0 MPaa); adsorbing $CO_2$ on the $CO_2$ adsorbent material; recovering a $N_2$ and $H_2$ stream from a forward end of the $CO_2$ swing adsorption reactor, the recovered $N_2$ and $H_2$ stream having a pressure that differs from the pressure of the exhaust stream by about 0.5 bara (about 50 kPa) or less; reducing the pressure in the $CO_2$ swing adsorption reactor to a pressure from about 1.0 bara (about 0.1 MPaa) to about 4.0 bara (about 0.4 MPaa) by outputting a blow down stream from at least one end of the $CO_2$ swing adsorption reactor; and purging the $CO_2$ swing adsorption reactor with a steam purge at a pressure from about 1.0 bara (about 0.1 MPaa) to about 4.0 bara (about 0.4 MPaa) to generate a $CO_2$ recovery stream, the $CO_2$ recovery stream comprising at least about 90% of the $CO_2$ present in the exhaust stream, the steam purge containing less than about 1.0 moles of $H_2O$ per mole of $CO_2$ in the reactor exhaust stream (e.g. less than about 0.8 moles of $H_2O$ per mole of $CO_2$ in the reactor exhaust stream); passing the $N_2$ and $H_2$ stream into a $N_2$ swing adsorption reactor comprising a $N_2$ adsorbent material selective for $N_2$ over $CO_2$ and $H_2$; adsorbing $N_2$ on the $N_2$ adsorbent material; recovering an $H_2$ stream having a purity of at least 95% from a forward end of the $N_2$ swing adsorption reactor, the recovered $H_2$ stream having a pressure that differs from the pressure of the $N_2$ and $H_2$ stream by about 0.5 bara (about 50 kPa) or less; reducing the pressure in the $N_2$ swing adsorption reactor to a pressure from about 1.0 bara (about 0.1 MPaa) to about 4.0 bara (about 0.4 MPaa) by outputting a blow down stream from at least one end of the $N_2$ swing adsorption reactor; and purging the $N_2$ swing adsorption reactor with a portion of the $H_2$ stream at a pressure from about 1.0 bara (about 0.1 MPaa) to about 4.0 bara (about 0.4 MPaa) to generate a $N_2$ recovery stream, the $N_2$ recovery stream comprising at least about 90% of the $N_2$ present in the exhaust stream. After desorption and purging the $CO_2$ swing adsorption reactor, it may be repressurized via the exhaust stream.

In one aspect, the exhaust stream comprises a power plant flue stream, a refinery flue stream, or a combination thereof. The exhaust stream can be generated by combustion of a fuel in a reducing atmosphere so as to control the combustion product composition. The method can be performed by admitting the exhaust stream to the $CO_2$ swing adsorption reactor first or by admitting the exhaust stream to the $N_2$ adsorption reactor first. In another aspect, the exhaust gas has an exhaust temperature from about 400° C. to about 500° C. In yet another aspect, the CO$_2$ swing adsorption reactor and the N$_2$ swing adsorption reactor respectively have a CO$_2$ and N$_2$ adsorption temperature that differs from the exhaust temperature by 20° C.

In another aspect, the CO$_2$ adsorbent material comprises an alkali metal carbonate and an oxide of an alkaline earth metal or a transition metal. In an additional aspect, the N$_2$ adsorbent material is a zeolite comprising at least one of (i) a CTS-1 zeolite, (ii) a ETS-4 zeolite, (iii) ITQ-55; (iv) 4A zeolite, or (v) 3A zeolite.

Additionally, the CO$_2$ swing adsorption reactor and the N$_2$ swing adsorption reactor can be arranged concentrically within a single vessel.

In another aspect, the purges can be reused/rerouted to feed a second CO$_2$ swing adsorption reactor or a second N$_2$ swing adsorption reactor.

BRIEF DESCRIPTION OF THE FIGURES

FIGS. 4a and 4b schematically show an alternative configuration for a pressure swing adsorption process for the production of N$_2$ and H$_2$.

FIG. 5 schematically shows an alternative configuration for a pressure swing adsorption process for the production of N$_2$ and H$_2$, which recycles the purge gas from an earlier purge.

DETAILED DESCRIPTION OF THE EMBODIMENTS

Figure 1:
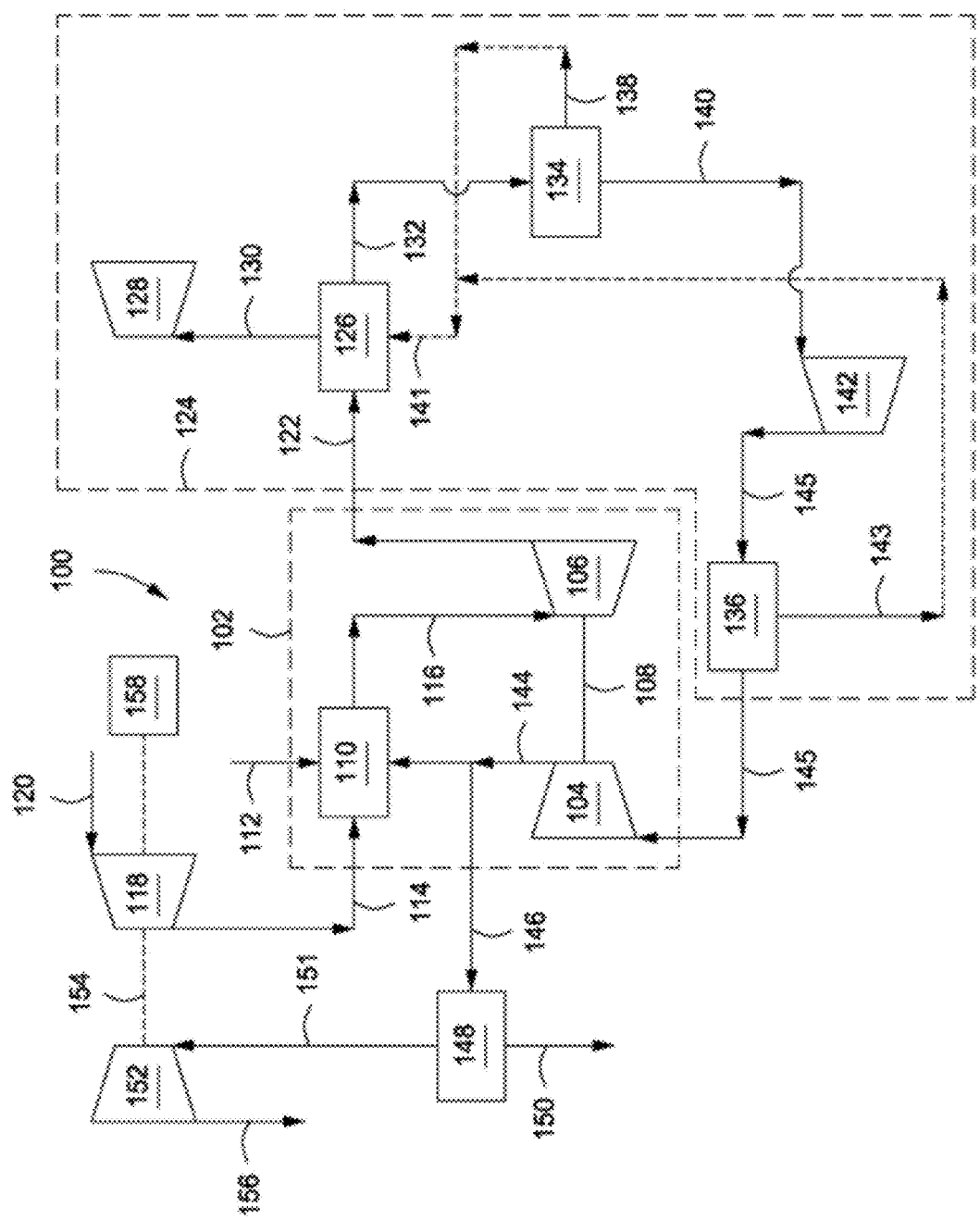
FIG. 1 schematically shows an example of a combined cycle system for generating electricity based on combustion of a carbon-based fuel.

In various aspects, methods are provided for production of nitrogen, carbon dioxide, and hydrogen from an exhaust stream. In a combined cycle generation system, the flue gas from a combustion reaction for a gas turbine can also be used to power a steam turbine. The flue gas can then be recycled for use as part of the input to the gas turbine. A portion of the exhaust gas can be effectively separated to generate a high purity carbon dioxide stream, while reducing and/or minimizing the energy required for the separation, and without needing to reduce the temperature of the flue gas. This can allow another (e.g., the remaining) portion of the exhaust gas, which can typically be composed of a majority of nitrogen, to be used to generate additional electricity, e.g., without having to adjust the pressure and/or temperature of the exhaust gas to accommodate the conditions required for the carbon dioxide separation process.

A roughly stoichiometric combustion reaction with a desirable feed can result in an exhaust primarily composed of CO$_2$, N$_2$, and H$_2$O. Oxygen rich combustion reactions, where there is excess oxygen after combustion of all of the fuel can result in an exhaust primarily composed of CO$_2$, N$_2$, and H$_2$O, but the unreacted oxygen may contribute to a higher level of undesirable products such as NO$_x$ species. Fuel-rich combustion reactions or combustion reactions that take place in reducing atmospheres, where there is excess fuel after all the oxidant, e.g. oxygen, can result in an exhaust primarily composed of CO$_2$, CO, N$_2$, H$_2$O, and H$_2$.

As used herein fuel-rich combustion refers to a combustion reaction where there is excess fuel remaining at the conclusion of the combustion. As used herein, a reducing atmosphere means an atmospheric condition in which total oxidation of a fuel is prevented by removal of oxygen and other oxidizing gases or vapor. Thus, combustion of a fuel in a reducing atmosphere, combined with appropriate separation processes, presents a unique opportunity to produce high purity CO$_2$ for capture, N$_2$ for electricity generation, and H$_2$ for various refining applications, such as hydroprocessing applications.

The CO present in the exhaust of a fuel-rich combustion reaction can be handled via the water gas shift (WGS) process. WGS describes the reaction of carbon monoxide and water vapor to form carbon dioxide and hydrogen.

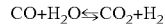

As can be see, the WGS reaction provides a source of hydrogen at the expense of carbon monoxide. Sorption Enhanced Water Gas Shift (SEWGS) describes processes where the WGS reaction is combined with CO$_2$ capture. A feed gas comprising CO enters the SEWGS unit where carbon monoxide is treated with steam to produce carbon dioxide and hydrogen. The carbon dioxide is then adsorbed onto an adsorbent producing a nearly pure hydrogen product. Carbon dioxide can then be desorbed to create a high purity CO$_2$ stream. In the embodiments described herein, the water gas shift of CO can occur either upstream of the process or such that all CO in the exhaust stream has been shifted to CO$_2$ and H$_2$ prior to entry into a first swing adsorption reactor or can be shifted simultaneously via SEWGS in the CO$_2$ swing adsorption reactor.

In some aspects, the separations described herein can be performed by using a pressure swing adsorption (PSA) processes to separate the H$_2$, CO$_2$, and N$_2$ at the temperature and pressure of the input gas flow to the combustion reaction. Using pressure swing adsorption to perform the separation can allow for recovery, for example, of at least about 60% (such as at least about 65%, at least about 70%, at least about 75%, at least about 80%, at least about 85%, at least about 90%, at least about 95%, at least about 97%, at least about 98%, at least about 99%, at least about 99.3%, or at least about 99.5%) of the CO$_2$ in the exhaust gas, e.g., while also generating an N$_2$ stream with at least about 90% purity (such as at least about 93% purity, at least about 95% purity, at least about 97% purity, at least about 98% purity, or at least about 99% purity) and/or a H$_2$ stream with at least about 80% purity (such as at least about 85% purity, at least about 90% purity, at least about 95% purity, at least about 97% purity, at least about 98% purity, at least about 99% purity, at least about 99.3% purity, or at least about 99.5% purity) and/or a CO$_2$ stream with at least about 80% purity (such as at least about 85% purity, at least about 90% purity, at least about 95% purity, at least about 97% purity, at least about 98% purity, at least about 99% purity, at least about 99.3% purity, or at least about 99.5% purity).

In various aspects, the operating conditions for a PSA reactor can be selected to facilitate the power generation process while still effectively capturing the exhaust gases. Using a relatively high temperature PSA can preserve the energy content of the N$_2$ portion of the exhaust gas, so that the N$_2$ gas stream can be used to power an additional turbine for electricity generation. By contrast, a conventional separation method for CO$_2$ separation such as solvent separation can typically require adjustment of the temperature and/or pressure of the stream to facilitate the separation. Thus, instead of requiring energy to modify the exhaust prior to treating the exhaust gases, use of a PSA reactor can allow the capture process to be adjusted to match the operating conditions for power generation.

The high temperature PSA can also be performed using a process cycle avoiding the need for high temperature steam and/or another energy intensive purge gas. This can allow high purity $CO_2$ to be recovered while reducing/minimizing the amount of energy lost to capture of the exhaust gases. Moreover, operating the combustion reaction in a reducing atmosphere can allow high purity $H_2$ to be produced.

Combined Cycle Process for Power Generation with Low Emissions

In various aspects, methods are provided for production of nitrogen, carbon dioxide, and hydrogen from an exhaust stream. One goal of power generation is to use input feeds (such as fuels) as efficiently as possible, so that power generation can be increased/optimized for a given amount of fuel and/or of equipment. Based on the conditions for effective power generation, a goal for control/capture of emissions can be to provide effective capture of emissions while reducing/minimizing the changes to the conditions for power generation.

Combustion in commercial gas turbines at reducing atmosphere, or fuel-rich conditions can prove advantageous to eliminate the cost of excess oxygen removal. By cooling the exhaust and condensing the water out of the cooled exhaust stream, a relatively high content $CO_2$ exhaust stream can be produced. While a portion of the exhaust gas can be utilized for temperature moderation in a closed Brayton cycle, a remaining purge stream can be used for EOR and/or enhanced hydrocarbon recovery applications and/or electric power can be produced with little or no sulfur oxides ($SO_x$), nitrogen oxides ($NO_x$), and/or $CO_2$ being emitted to the atmosphere. The result of this process can include the production of power in three separate cycles and the manufacturing of additional $CO_2$. In some aspects, performing fuel rich combustion can allow for generation of an exhaust stream consisting substantially of $CO_2$, CO, $H_2$, $H_2O$, and $N_2$. An exhaust stream consisting substantially of $CO_2$, CO, $H_2$, $H_2O$, and $N_2$ is defined as an exhaust stream that contains about 5 mol % or less of other gas molecules, e.g., about 2.5 mol % or less or about 1 mol % or less.

FIG. 1 depicts a schematic of an illustrative integrated system 100 for power generation and $CO_2$ recovery using a combined-cycle arrangement, according to one or more embodiments. In at least one embodiment, the power generation system 100 can include a gas turbine system 102 characterized as a power-producing, closed Brayton cycle. The gas turbine system 102 can have a first or main compressor 104 coupled to an expander 106 via a shaft 108. The shaft 108 can be any mechanical, electrical, and/or other power coupling, thereby allowing a portion of the mechanical energy generated by the expander 106 to drive the main compressor 104. In at least one embodiment, the gas turbine system 102 can be a standard gas turbine, where the main compressor 104 and expander 106 form the compressor and expander ends, respectively. In other embodiments, however, the main compressor 104 and expander 106 can be individualized components in the system 102.

The gas turbine system 102 can also include a combustion chamber 110 configured to combust a fuel introduced via line 112 mixed with an oxidant introduced via line 114. In one or more embodiments, the fuel in line 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or any combinations thereof.

The oxidant via line 114 can be derived from a second or inlet compressor 118 fluidly coupled to the combustion chamber 110 and adapted to compress a feed oxidant introduced via line 120. In one or more embodiments, the feed oxidant in line 120 can include atmospheric air, enriched air, or combinations thereof. When the oxidant in line 114 includes a mixture of atmospheric air and enriched air, the enriched air can be compressed by the inlet compressor 118 before and/or after being mixed with the atmospheric air.

The combustion chamber 110 can also receive a compressed exhaust gas in line 144, including an exhaust gas recirculation primarily having $CO_2$ and nitrogen components. The compressed exhaust gas in line 144 can be derived from the main compressor 104 and adapted to help facilitate a fuel rich combustion of the compressed oxidant in line 114 and fuel in line 112 by moderating the temperature of the combustion products. As can be appreciated, recirculating the exhaust gas can serve to increase the $CO_2$ concentration in the exhaust gas.

An exhaust gas in line 116 directed to the inlet of the expander 106 can be generated as a product of combustion of the fuel in line 112 and the compressed oxidant in line 114, in the presence of the compressed exhaust gas in line 144. In at least one embodiment, the fuel in line 112 can be primarily natural gas, thereby generating a discharge or exhaust gas via line 116 that can include volumetric portions of vaporized water, $CO_2$, CO, $H_2$, nitrogen, nitrogen oxides ($NO_x$), and sulfur oxides ($SO_x$). In some embodiments, a small portion of unburned fuel in line 112 or other compounds can also be present in the exhaust gas in line 116 due to combustion equilibrium limitations. As the exhaust gas in line 116 expands through the expander 106, it can generate mechanical power to drive the main compressor 104, an electrical generator, and/or other facilities, and can also produce a gaseous exhaust in line 122 having a heightened $CO_2$ content resulting from the influx of the compressed exhaust gas in line 144. In some implementations, the expander 106 may be adapted to produce additional mechanical power that may be used for other purposes.

Additionally or alternately, the power generation system 100 can include an exhaust gas recirculation (EGR) system 124, which can include a heat recovery steam generator (HRSG) 126, or similar device, fluidly coupled to a steam gas turbine 128. In at least one embodiment, the combination of the HRSG 126 and the steam gas turbine 128 can be characterized as a power-producing closed Rankine cycle. In combination with the gas turbine system 102, the HRSG 126 and the steam gas turbine 128 can form part of a combined-cycle power generating plant, such as a natural gas combined-cycle (NGCC) plant. The gaseous exhaust in line 122 can be introduced to the HRSG 126 in order to generate steam via line 130 and a cooled exhaust gas in line 132. Additionally or alternately, the steam in line 130 can be sent to the steam gas turbine 128 to generate additional electrical power.

The cooled exhaust gas in line 132 can be sent to a first cooling unit 134 adapted to cool the cooled exhaust gas in line 132 and generate a cooled gas stream 140. The first cooling unit 134 can include, for example, one or more contact coolers, trim coolers, evaporative cooling unit, or any combination thereof. The first cooling unit 134 can additionally or alternately be adapted to remove a portion of any condensed water from the cooled exhaust gas in line 132 via a water dropout stream 138. In at least one embodiment, the water dropout stream 138 may be routed to the HRSG 126 via line 141 to provide a water source for the generation of additional steam in line 130 therein. Additionally or alternately, the water recovered via the water dropout stream 138 can be used for other downstream applications, such as supplementary heat exchanging processes.

In most embodiments, the cooled gas stream 140 can be directed to a boost compressor 142. Cooling the cooled exhaust gas in line 132 in the first cooling unit 134 can reduce the power required to compress the cooled as stream 140 in the boost compressor 142. As opposed to a conventional fan or blower system, the boost compressor 142 can be configured to compress, and thus increase, the overall density of the cooled gas stream 140, thereby directing a pressurized gas in line 145 downstream, where the pressurized gas in line 145 can thus exhibit an increased mass flow rate for the same volumetric flow. This can prove advantageous, since the main compressor 104 can be volume-flow limited, and directing more mass flow through the main compressor 104 can result in higher discharge pressures, thereby translating into higher pressure ratios across the expander 106. Higher pressure ratios generated across the expander 106 can allow for higher inlet temperatures and, therefore, an increase in expander 106 power and/or efficiency. As can be appreciated, this may prove advantageous, since the $CO_2$-rich exhaust gas in line 116 can generally maintain a higher specific heat capacity.

Since the suction pressure of the main compressor 104 can typically be a function of its suction temperature, a cooler suction temperature can generally demand less power to operate the main compressor 104 for the same mass flow. Consequently, the pressurized gas in line 145 can optionally be directed to a second cooling unit 136, e.g., which can include one or more direct contact coolers, trim coolers, evaporative cooling units, or any combination thereof. In at least one embodiment, the second cooling unit 136 can serve as an aftercooler adapted to remove at least a portion of the heat of compression generated by the boost compressor 142 on the pressurized gas in line 145. The second cooling unit 136 can additionally or alternatively extract additional condensed water via a water dropout stream 143. In some such embodiments, the water dropout streams 138, 143 can converge into stream 141 and may or may not be routed to the HRSG 126 to generate additional steam via line 130 therein. While only first and second cooling units 134, 136 are depicted herein, any desired number of cooling units can be employed to suit a variety of applications, without departing from the scope of the disclosure.

The main compressor 104 can be configured to receive and compress the pressurized gas in line 145 to a pressure nominally at or above the pressure of the combustion chamber 110, thereby generating the compressed exhaust gas in line 144. As can be appreciated, cooling the pressurized gas in line 145 in the second cooling unit 136 after compression in the boost compressor 142 can allow for an increased volumetric mass flow of exhaust gas into the main compressor 104. Consequently, this can reduce the amount of power required to compress the pressurized gas in line 145 to a predetermined pressure.

In many embodiments, a purge stream 146 can be recovered from the compressed exhaust gas in line 144 and subsequently treated in a separator 148 to capture exhaust gas constituents at an elevated pressure via line 150. Preferably, the separator can be a pressure swing adsorption unit, as described in further detail below. The separated exhaust gas constituents in line 150 can be used for sales, used in another processes requiring such gases, and/or further compressed and injected into a terrestrial reservoir for enhanced oil recovery (EOR), enhanced hydrocarbon recovery (EHR), sequestration, or another purpose.

A residual stream 151, essentially depleted of $CO_2$ and consisting primarily of nitrogen and/or hydrogen, can additionally or alternately be derived from the separator 148. In some embodiments, the residual stream 151 can be introduced to a gas expander 152 to provide power and an expanded depressurized gas, or exhaust gas, via line 156. The expander 152 can be, for example, a power-producing nitrogen expander. As depicted, the gas expander 152 can be optionally coupled to the inlet compressor 118 through a common shaft 154 or other mechanical, electrical, or other power coupling, thereby allowing a portion of the power generated by the gas expander 152 to drive the inlet compressor 118. However, during startup of the system 100 and/or during normal operation, when the gas expander 152 is unable to supply all the required power to operate the inlet compressor 118, at least one motor 158, such as an electric motor, can be used synergistically with the gas expander 152. For instance, the motor 158 can be sensibly sized such that, during normal operation of the system 100, the motor 158 can be configured to supply the power short-fall from the gas expander 152. In other embodiments, however, the gas expander 152 can be used to provide power to other applications, and not directly coupled to the inlet compressor 118. For example, there may be a substantial mismatch between the power generated by the expander 152 and the requirements of the compressor 118. In such cases, the expander 152 could be adapted to drive a smaller (or larger) compressor (not shown) that may demand less (or more) power.

An expanded depressurized gas in line 156, primarily consisting of dry nitrogen gas, can be discharged from the gas expander 152. In at least one embodiment, the combination of the gas expander 152, inlet compressor 118, and $CO_2$ separator 148 can be characterized as an open Brayton cycle, and/or a third power-producing component of the power generation system 100. Conventional systems and methods of expanding the nitrogen gas in the residual stream 151, and variations thereof, are believed to be known in the art and are thus not discussed herein.

Additionally or alternatively, gas expander 152 can be replaced and/or complemented with a downstream compressor 158. At least a portion (and up to all) of the residual stream 151 can be compressed in a downstream compressor to generate a compressed exhaust gas via line 160, which can be suitable for injection into a reservoir for pressure maintenance applications. In applications where methane gas is typically reinjected into hydrocarbon wells to maintain well pressures, compressing the residual stream 151 may prove advantageous. For example, the pressurized nitrogen gas in line 160 can instead be injected into the hydrocarbon wells, and any residual methane gas can be sold or otherwise used as fuel in related applications, such as in line 112.

An example of operation of the system 100 will now be discussed. As should be appreciated, specific temperatures and pressures achieved/experienced in the various components of any of the embodiments disclosed herein can change depending on, among other factors, the purity of the oxidant used and/or the specific makes and/or models of expanders, compressors, coolers, etc. Accordingly, it should be appreciated that the particular data described herein is for illustrative purposes only and should not be construed as the only interpretation thereof. In an embodiment, the inlet compressor 118 can provide compressed oxidant in line 114 at a pressure between about 280 psia (about 1.9 MPaa) and about 300 psia (about 2.1 MPaa). Also contemplated herein, however, is aeroderivative gas turbine technology, which can produce and consume pressures of up to about 750 psia (about 5.2 MPaa) and higher.

The main compressor 104 can be configured to recycle and compress exhaust gas into the compressed exhaust gas in line 144 at a pressure nominally at or above the combustion chamber 110 pressure, and to use a portion of that exhaust gas as a diluent in the combustion chamber 110. Because amounts of diluent needed in the combustion chamber 110 can depend on the purity of the oxidant used for fuel-rich combustion or the particular model/design of expander 106, a ring of thermocouples and/or oxygen sensors (not shown) can be disposed on the outlet of the expander 106. In operation, the thermocouples and/or sensors can be adapted to regulate and determine the volume of exhaust gas required as diluent needed to cool the products of combustion to the required expander inlet temperature, and also to provide feedback to regulate the amount of oxidant being injected into the combustion chamber 110. Thus, in response to the heat requirements detected by the thermocouples and/or the oxygen levels detected by the oxygen sensors, the volumetric mass flow of compressed exhaust gas in line 144 and compressed oxidant in line 114 can be manipulated up or down to track the demand.

In at least one embodiment, a pressure drop of about 12-13 psi (about 83-90 kPa) can be experienced across the combustion chamber 110 during fuel-rich combustion. Combustion of the fuel in line 112 and the compressed oxidant in line 114 can generate temperatures between about 2000° F. (about 1093° C.) and about 3000° F. (about 1649° C.) and pressures ranging from about 250 psia (about 1.7 MPaa) to about 300 psia (about 2.1 MPaa).

The gaseous exhaust in line 122 exiting the expander 106 can exhibit pressures at or near ambient, e.g., about 13-17 psia (about 90-120 kPaa). The temperature of the gaseous exhaust in line 122 can be from about 1225° F. (about 663° C.) to about 1275° F. (about 691° C.) before passing through the HRSG 126 to generate steam in line 130 and a cooled exhaust gas in line 132. In one or more embodiments, the cooling unit 134 can reduce the temperature of the cooled exhaust gas in line 132, thereby generating the cooled gas stream 140 having a temperature between about 32° F. (about 0° C.) and about 120° F. (about 49° C.). As can be appreciated, such temperatures can fluctuate, e.g., depending on wet bulb temperatures during specific seasons in specific locations around the globe.

According to one or more embodiments, the boost compressor 142 can be configured to elevate the pressure of the cooled gas stream 140 to a pressure ranging from about 17 psia (about 120 kPaa) to about 21 psia (about 140 kPaa). As a result, the main compressor 104 can eventually receive and compress an exhaust with a higher density and increased mass flow, thereby allowing for a substantially higher discharge pressure while maintaining the same or similar pressure ratio. In order to further increase the density and mass flow of the exhaust gas, the pressurized gas in line 145 discharged from the boost compressor 142 can then be further cooled in the optional second cooling unit 136, which can, in some embodiments, be configured to reduce the pressurized gas temperature in line 145 to about 105° F. (about 41° C.) before being directed to the main compressor 104.

Additionally or alternately, the temperature of the compressed exhaust gas in line 144 discharged from the main compressor 104, and consequently the temperature of the purge stream 146, can be about 800° F. (about 427° C.), with a pressure of around 280 psia (about 1.9 MPaa).

Swing Adsorber Processes—Overview

Pressure swing adsorption (PSA) relies on swinging or cycling pressure over a bed of adsorbent through a range of values. In PSA processes, a gaseous mixture is conducted under pressure for a period of time over a first bed of a solid sorbent that is selective, or relatively selective, for one or more components, usually regarded as a contaminant, to be removed from the gaseous mixture. For example, a feed can be introduced into a PSA apparatus at a feed pressure. At the feed pressure, one or more of the components (gases) in the feed can be selectively (or relatively selectively) (ad)sorbed, while one or more other components (gases) can pass through with lower or minimal adsorption. A component (gas) that is selectively (ad)sorbed can be referred to as a "heavy" component of a feed, while a gas that is not selectively (ad)sorbed can be referred to as a "light" component of a feed. For convenience, a reference to the "heavy" component of the feed can refer to all components (gases) that are selectively (ad)sorbed, unless otherwise specified. Similarly, a reference to the "light" component can refer to all components (gases) that are not selectively (ad)sorbed, unless otherwise specified. After a period of time, the feed flow into the PSA apparatus can be stopped. The feed flow can be stopped based on a predetermined schedule, based on detection of breakthrough of one or more heavy components, based on (ad)sorption of the heavy component(s) corresponding to at least a threshold percentage of the total capacity of the (ad)sorbent, or based on any other convenient criteria. The pressure in the reactor can then be reduced to a desorption pressure that can allow the selectively (ad)sorbed component(s) (gas(es)) to be released from the (ad)sorbent. Optionally, one or more purge gases can be used prior to, during, and/or after the reduction in pressure to facilitate release of the selectively (ad)sorbed component(s) (gas(es)). Depending on its nature, a full PSA cycle can optionally be performed at a roughly constant temperature. As PSA is usually enabled by at least adsorption and usually occurs on gaseous components, the terms "adsorption"/"adsorbent" and "gas(es)" are used as descriptors in the instant specification and claims, without intending to be limiting in scope, even though "absorption"/"absorbent"/"sorbent"/"sorption" and "component(s)" may be more generally applicable.

Multiple beds can be used to enable a complete cycle, where typically every bed sequentially goes through the same cycle. When a first PSA reactor satisfies a condition, such as the adsorbent in the reactor becoming sufficiently saturated, the feed flow can be switched to a second reactor. The first PSA reactor can then be regenerated by having the adsorbed gases released. To allow for a continuous feed flow, a sufficient number of PSA reactors and/or adsorbent beds can be used so that the first PSA reactor is finished regenerating prior to at least one other PSA reactor satisfying the condition for switching reactors.

Swing Adsorber Processes—Process Cycle

In various aspects, a PSA reactor can be used for performing a separation on a stream containing $H_2$, $CO_2$ and $N_2$. An example of such a stream can include the exhaust stream from a combustion reaction for providing power for a gas turbine. Preferably, the exhaust stream can be the exhaust from a fuel-rich combustion reaction. Prior to use as a feed for separation by PSA, the exhaust stream can undergo further processing, such as condensation to remove water, combustion to remove excess fuel, adsorption for removal of $NO_x$ species, water gas shift to remove CO, and/or other types of processing to remove components different from $H_2$, $CO_2$, and $N_2$. In some aspects, the portion of the exhaust stream used as the feed for the PSA reactor can have a water content of less than about 1.0 vol %, such as less than about 0.5 vol %. Additionally or alternately, the portion of the exhaust stream used as the feed for the PSA reactor can have an $O_2$ content of less than about 3.0 vol %, such as less than about 1.0 vol % or less than about 0.5 vol %. Further additionally or alternately, the feed into the PSA reactor can be substantially composed of $H_2$, $CO_2$, and $N_2$, where components of the input gas feed different from $H_2$, $CO_2$, and $N_2$ are present in an amount of about 1.0 vol % or less each, such as less than about 0.5 vol % each. Still further additionally or alternately, in a feed substantially composed of $H_2$, $CO_2$, and $N_2$, the combined vol % of components other than $H_2$, $CO_2$, and $N_2$ can be about 2.0 vol % or less, such as about 1.0 vol % or less or 0.5 vol % or less.

To perform a separation, a portion of the exhaust stream can be introduced into a PSA system. The portion of the exhaust stream can be withdrawn from an exhaust system at a location after the temperature and pressure of the exhaust stream have been modified (and/or after desired temperature and pressure have been obtained) for use as part of the input gas flow to the combustion reaction. At such point in the system, the exhaust stream can have a temperature from about 100° C. to about 600° C., e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., from about 500° C. to about 600° C. Additionally or alternately, the temperature can be at least about 100° C., e.g., at least about 120° C., at least about 300° C., at least about 400° C., or at least about 440° C. Further additionally or alternately, the temperature can be about 575° C. or less, about 550° C. or less, about 500° C. or less, about 475° C. or less, about 460° C. or less, or about 440° C. or less. Still further additionally or alternately, the pressure of the exhaust stream can be at least about 10 bara (about 1.0 MPaa), e.g., at least about 15 bara (about 1.5 MPaa), at least about 20 bara (about 2.0 MPaa), at least about 25 bara (about 2.5 MPaa), or at least about 30 bara (about 3.0 MPaa). Yet further additionally or alternately, the pressure can be about 60 bara (6.0 MPaa) or less, e.g., about 50 bara (about 5.0 MPaa) or less, about 40 bara (about 4.0 MPaa) or less, about 35 bara (about 3.5 MPaa) or less, about 30 bara (about 3.0 MPaa) or less, about 25 bara (about 2.5 MPaa) or less, or about 22.5 bara (about 2.25 MPaa) or less. In some alternative aspects, other locations for withdrawing the portion of the exhaust stream can be selected, so long as the withdrawn portion has similar temperature and pressure values.

In some aspects, the exhaust stream can be introduced into the PSA system at a separation temperature and a separation pressure that can correspond to the temperature and pressure of the exhaust stream upon exit from the fuel-rich combustion. However, some variation in temperature and/or pressure may occur between withdrawal of the portion of the exhaust stream from the system and introduction of the exhaust stream into the PSA system. For example, the separation temperature for the portion of the exhaust stream introduced into the PSA system can differ from the temperature in the system by about 20° C. or less, e.g., by about 15° C. or less or by about 10° C. or less. It is noted that, although having the same temperature for the separation temperature and the temperature in the exhaust stream (i.e., a difference of approximately 0° C.) is included within the enumerated differences, in some rare embodiments the temperature differences can optionally exclude 0° C. Additionally or alternately, the separation pressure for the portion of the exhaust stream introduced into the PSA system can differ from the pressure in the system by about 5 bar (0.5 MPa) or less, e.g., about 2 bara (0.2 MPa) or less, about 1 bara (about 0.1 MPa) or less, or about 0.5 bar (about 50 kPa) or less.

Figure 2:
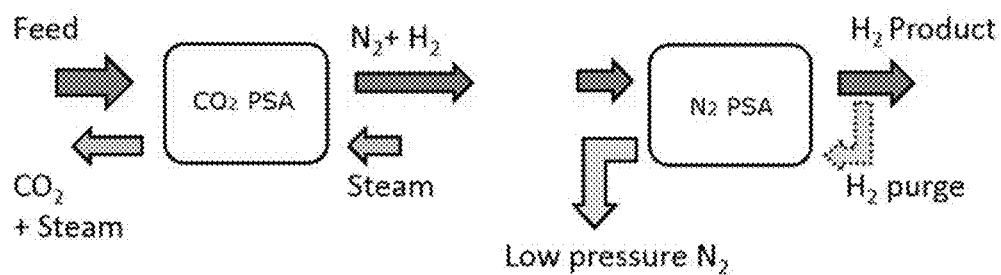
FIG. 2 schematically shows a configuration for a pressure swing adsorption process for the production of N$_2$ and H$_2$.

With reference to FIG. 2, an exhaust stream comprising hydrogen, nitrogen, and carbon dioxide is introduced into the PSA system. In the configuration shown in FIG. 2, the exhaust is introduced into the $CO_2$ swing adsorption reactor first. The $CO_2$ swing adsorption reactor contains an adsorbent material selective for $CO_2$ over $N_2$ and $H_2$. Thus, the $N_2$ and $H_2$ can primarily pass through the reactor while the $CO_2$ can be selectively adsorbed within the reactor. The adsorption of $CO_2$ from the feed can result in a $N_2$ and $H_2$ stream. The feed can be passed through the $CO_2$ swing adsorption rea until one or more pre-defined criteria is satisfied for switching the feed to another reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of $CO_2$ is detected in the $N_2$ and $H_2$ stream. Further additionally or alternatively, the feed can be passed into the reactor until the amount of $CO_2$ that has entered the reactor is approximately equal to a threshold value of the adsorbent capacity of the reactor. In such a situation, for example, the feed can be passed into the reactor until the amount of $CO_2$ that has entered the reactor is equal to at least about 75% of the adsorbent capacity of the adsorbent material in the reactor, such as at least about 80%, at least about 85%, or at least about 90%. A typical PSA cycle can involve introducing feed into the reactor for about 30 seconds to about 300 seconds, e.g., for about 60 seconds to about 120 seconds.

After the feed is stopped, the pressure in the $CO_2$ swing adsorption reactor can be reduced, e.g., using one or more blow down processes. In a blow down process, one or both sides of a PSA reactor can be opened to allow pressure to release in the form of a blow down gas stream. The blow down gas stream can generally include a majority portion of $N_2$ and can also typically include some $CO_2$. The amount of adsorbed $CO_2$ released in the blow down process(es) can depend on the nature of the adsorbent. In some conventional PSA reactors, the blow down gas stream can be exhausted from the feed input side of the reactor. Alternatively, one or more blow down gas streams can be exhausted from the product side of the reactor. For example, one option can include having an initial blow down process exiting from the product side of the reactor followed by a second blow down process allowing a gas stream to exit from both sides of the reactor. The blow down process(es) can reduce the pressure in the reactor to a value from about 0.9 bara (about 90 kPaa) to about 3.0 bara (about 0.3 MPaa), e.g., from about 1.0 bara (about 0.1 MPaa) to about 3.0 bara (about 0.3 MPaa), from about 1.1 bara (about 110 kPaa) to about 3.0 bara (about 0.3 MPaa), from about 1.3 bara (about 130 kPaa) to about 3.0 bara (about 0.3 MPaa), from about 0.9 bara (about 90 kPaa) to about 2.6 bara (about 260 kPaa), from about 1.0 bara (about 0.1 MPaa) to about 2.6 bara (about 260 kPaa), from about 1.1 bara (about 110 kPaa) to about 2.6 bara (about 260 kPaa), from about 1.3 bara (about 130 kPaa) to about 2.6 bara (about 260 kPaa), from about 0.9 bara (about 90 kPaa) to about 2.0 bara (about 0.2 MPaa), from about 1.0 bara (about 0.1 MPaa) to about 2.0 bara (about 0.2 MPaa), from about 1.1 bara (about 110 kPaa) to about 2.0 bara (about 0.2 MPaa), or from about 1.3 bara (about 130 kPaa) to about 2.0 bara (about 0.2 MPaa). In many embodiments, maintaining a pressure above atmospheric pressure in the reactor can assist with the adsorbent retaining $CO_2$ until a subsequent purge step when desorption is desired. In some embodiments, the length of time for the blow down processes can be from about 30 seconds to about 120 seconds.

In some aspects, the use of multiple blow down steps can be desirable for creating blow down streams that are easier to subsequently process. For example, during adsorption of $CO_2$ from an exhaust gas, a profile can typically develop in the reactor, with a higher content of non-adsorbed $CO_2$ near the back (input) end of the reactor and a lower content of $CO_2$ near the exit (front) end of the reactor. Based on this profile, a partial blow down from only the exit (front) end of the reactor can be used to produce a blow down output with a low $CO_2$ content. This initial blow down step can result in the higher $CO_2$ content near the back (input) end of the reactor being distributed more evenly throughout the reactor. As this occurs, it can then be more efficient to allow blow down output streams to exit from both ends of the reactor until the desired lower pressure can be achieved.

After the blow down process(es), one or more purge gas flows can be used to remove the adsorbed $CO_2$ from the $CO_2$ swing adsorption reactor. One option can include using a steam purge at a pressure from about 1.0 bara (about 0.1 MPaa) to about 3.0 bara (about 0.3 MPaa), e.g., from about 1.1 bara (about 110 kPaa) to about 3.0 bara (about 0.3 MPaa), from about 1.3 bara (about 130 kPaa) to about 3.0 bara (about 0.3 MPaa), from about 1.0 bara (about 0.1 MPaa) to about 2.6 bara (about 260 kPaa), from about 1.1 bara (about 110 kPaa) to about 2.6 bara (about 260 kPaa), from about 1.3 bara (about 130 kPaa) to about 2.6 bara (about 260 kPaa), from about 1.0 bara (about 0.1 MPaa) to about 2.0 bara (about 0.2 MPaa), from about 1.1 bara (about 110 kPaa) to about 2.0 bara (about 0.2 MPaa), or from about 1.3 bara (about 130 kPaa) to about 2.0 bara (about 0.2 MPaa), to assist in desorbing the $CO_2$. An alternative option can include using a steam purge at a pressure above 3.0 bara (0.3 MPaa), e.g., of at least 4.0 bara (0.4 MPaa), of at least 5.0 bara (0.5 MPaa), from above 3.0 bara (0.3 MPaa) to about 20 bara (about 2 MPaa), from above 3.0 bara (0.3 MPaa) to about 15 bara (about 1.5 MPaa), from above 3.0 bara (0.3 MPaa) to about 10 bara (about 1 MPaa), from above 3.0 bara (0.3 MPaa) to about 8 bara (about 0.8 MPaa), from above 3.0 bara (0.3 MPaa) to about 6 bara (about 0.6 MPaa), from above 3.0 bara (0.3 MPaa) to about 5 bara (about 0.5 MPaa), from 4.0 bara (0.4 MPaa) to about 20 bara (about 2 MPaa), from 4.0 bara (0.4 MPaa) to about 15 bara (about 1.5 MPaa), from 4.0 bara (0.4 MPaa) to about 10 bara (about 1 MPaa), from 4.0 bara (0.4 MPaa) to about 8 bara (about 0.8 MPaa), from 4.0 bara (0.4 MPaa) to about 6 bara (about 0.6 MPaa), from 4.0 bara (0.4 MPaa) to about 5 bara (about 0.5 MPaa), from 5.0 bara (0.5 MPaa) to about 20 bara (about 2 MPaa), from 5.0 bara (0.5 MPaa) to about 15 bara (about 1.5 MPaa), from 5.0 bara (0.5 MPaa) to about 10 bara (about 1 MPaa), from 5.0 bara (0.5 MPaa) to about 8 bara (about 0.8 MPaa), or from 5.0 bara (0.5 MPaa) to about 6 bara (about 0.6 MPaa). The steam purge can result in a product $CO_2$ output stream that can also include $H_2O$ and a lesser amount of $N_2$ and $H_2$. In some embodiments, the steam purge can last for about 25 seconds to about 60 seconds. After removal of water, the product $CO_2$ stream can have a purity of at least about 60%, e.g., at least about 65%, at least about 70%, at least about 75%, at least about 80%, at least about 85 vol %, at least about 90 vol %, at least about 92 vol %, at least about 94 vol %, at least about 95 vol %, at least about 96%, at least about 97%, at least about 98%, at least about 99%, at least about 99.3%, or at least about 99.5%. Additionally or alternately, the amount of $CO_2$ recovered can correspond to at least about 80 vol %, e.g., at least about 85 vol %, at least about 90 vol %, at least about 92 vol %, at least about 94 vol %, at least about 95 vol %, at least about 96%, at least about 97%, at least about 98%, at least about 99%, at least about 99.3%, or at least about 99.5%.

The amount of steam used in the steam purge can correspond to about 1.0 moles of water or less per mole of $CO_2$ in the feed, e.g., about 0.9 moles of water or less per mole of $CO_2$ in the feed, about 0.75 moles of water or less per mole of $CO_2$ in the feed, about 0.6 moles of water or less per mole of $CO_2$ in the feed, about 0.5 moles of water or less per mole of $CO_2$ in the feed, or about 0.4 moles of water or less per mole of $CO_2$ in the feed. Using less steam in the purge can be beneficial, because the amount of steam used can typically correspond to the amount of energy used for the $CO_2$ recovery. It is noted that the feed can typically contain at least 50 mol %, and often at least 75 mol %, of $N_2$. Thus, a comparison of the number of moles of water per total moles of gas (including $H_2$, $N_2$, and $CO_2$) in the feed could produce still lower values, e.g., about 0.5 moles of water or less per mole of gas in the feed, about 0.4 moles of water or less per mole of gas in the feed, about 0.3 moles of water or less per mole of gas in the feed, about 0.25 moles of water or less per mole of gas in the feed, about 0.2 moles of water or less per mole of gas in the feed, about 0.15 moles of water or less per mole of gas in the feed, or about 0.1 moles of water or less per mole of gas in the feed. In such embodiments where there is a non-zero amount of steam used in the steam purge, the molar ratio of steam can be at least about 0.05 moles of water or less per mole of $CO_2$ in the feed (e.g., at least about 0.1 moles of water or less per mole of $CO_2$ in the feed, at least about 0.2 moles of water or less per mole of $CO_2$ in the feed, or at least about 0.3 moles of water or less per mole of $CO_2$ in the feed) and/or can be at least about 0.01 moles of water or less per mole of gas in the feed (e.g., at least about 0.02 moles of water or less per mole of gas in the feed, at least about 0.05 moles of water or less per mole of gas in the feed, or at least about 0.1 moles of water or less per mole of gas in the feed).

The $N_2$ and $H_2$ stream is then passed to a $N_2$ swing adsorption reactor. The $N_2$ swing adsorption reactor contains an adsorbent material selective for $N_2$ over $CO_2$ and $H_2$. Thus, as shown in FIG. 2, the $H_2$ can primarily pass through the reactor while the $N_2$ can be selectively adsorbed within the reactor. The adsorption of $N_2$ from the feed can result in a high purity $H_2$ stream. The feed can be passed through the $N_2$ swing adsorption reactor until one or more pre-defined criteria is satisfied for switching the feed to another reactor or otherwise stopping the flow of feed gas. Any convenient pre-defined criteria can be used. For example, the feed can be passed through the reactor for a specified time period. Additionally or alternately, the feed can be passed into the reactor until a breakthrough amount of $N_2$ is detected in the $H_2$ stream. Further additionally or alternately, the feed can be passed into the reactor until the amount of $N_2$ that has entered the reactor is approximately equal to a threshold value of the adsorbent capacity of the reactor. In such a situation, for example, the feed can be passed into the reactor until the amount of $N_2$ that has entered the reactor is equal to at least about 75% of the adsorbent capacity of the adsorbent material in the reactor, such as at least about 80%, at least about 85%, or at least about 90%.

After the feed is stopped, the pressure in the $N_2$ swing adsorption reactor can be reduced, e.g., using one or more blow down processes as described in the above paragraphs with respect to the $CO_2$ swing adsorption reactor.

After the blow down process(es), one or more purge gas flows can be used to remove the adsorbed $CO_2$ from the $CO_2$ swing adsorption reactor. One option can include using a $H_2$ purge from the $H_2$ product at a pressure from about 1.0 bara (about 0.1 MPaa) to about 3.0 bara (about 0.3 MPaa), e.g., from about 1.1 bara (about 110 kPaa) to about 3.0 bara (about 0.3 MPaa), from about 1.3 bara (about 130 kPaa) to about 3.0 bara (about 0.3 MPaa), from about 1.0 bara (about 0.1 MPaa) to about 2.6 bara (about 260 kPaa), from about 1.1 bara (about 110 kPaa) to about 2.6 bara (about 260 kPaa), from about 1.3 bara (about 130 kPaa) to about 2.6 bara (about 260 kPaa), from about 1.0 bara (about 0.1 MPaa) to about 2.0 bara (about 0.2 MPaa), from about 1.1 bara (about 110 kPaa) to about 2.0 bara (about 0.2 MPaa), or from about 1.3 bara (about 130 kPaa) to about 2.0 bara (about 0.2 MPaa), to assist in desorbing the $CO_2$. An alternative option can include using a $H_2$ purge at a pressure above 3.0 bara (0.3 MPaa), e.g., of at least 4.0 bara (0.4 MPaa), of at least 5.0 bara (0.5 MPaa), from above 3.0 bara (0.3 MPaa) to about 20 bara (about 2 MPaa), from above 3.0 bara (0.3 MPaa) to about 15 bara (about 1.5 MPaa), from above 3.0 bara (0.3 MPaa) to about 10 bara (about 1 MPaa), from above 3.0 bara (0.3 MPaa) to about 8 bara (about 0.8 MPaa), from above 3.0 bara (0.3 MPaa) to about 6 bara (about 0.6 MPaa), from above 3.0 bara (0.3 MPaa) to about 5 bara (about 0.5 MPaa), from 4.0 bara (0.4 MPaa) to about 20 bara (about 2 MPaa), from 4.0 bara (0.4 MPaa) to about 15 bara (about 1.5 MPaa), from 4.0 bara (0.4 MPaa) to about 10 bara (about 1 MPaa), from 4.0 bara (0.4 MPaa) to about 8 bara (about 0.8 MPaa), from 4.0 bara (0.4 MPaa) to about 6 bara (about 0.6 MPaa), from 4.0 bara (0.4 MPaa) to about 5 bara (about 0.5 MPaa), from 5.0 bara (0.5 MPaa) to about 20 bara (about 2 MPaa), from 5.0 bara (0.5 MPaa) to about 15 bara (about 1.5 MPaa), from 5.0 bara (0.5 MPaa) to about 10 bara (about 1 MPaa), from 5.0 bara (0.5 MPaa) to about 8 bara (about 0.8 MPaa), or from 5.0 bara (0.5 MPaa) to about 6 bara (about 0.6 MPaa). The $H_2$ purge can result in a product $N_2$ output stream that can also include $H_2$. In some embodiments, the purge can last for about 25 seconds to about 60 seconds.

The product $N_2$ stream can have a purity of at least about 85 vol %, e.g., at least about 88 vol %, at least about 90 vol %, at least about 92 vol %, at least about 93 vol %, at least about 94 vol %, at least about 95 vol %, at least about 96 vol %, at least about 97 vol %, or at least about 98 vol %. After optional removal of water, the product $N_2$ stream can have a purity of at least about 90 vol %, e.g., at least about 95 vol %, at least about 97 vol %, at least about 98 vol %, or at least 99 vol %. The product $H_2$ stream can have a purity of at least about 85 vol %, e.g., at least about 88 vol %, at least about 90 vol %, at least about 92 vol %, at least about 93 vol %, at least about 94 vol %, at least about 95 vol %, at least about 96 vol %, at least about 97 vol %, or at least about 98 vol %. After optional removal of water, the product $N_2$ stream can have a purity of at least about 90 vol %, e.g., at least about 95 vol %, at least about 97 vol %, at least about 98 vol %, or at least 99 vol %. The pressure of the $H_2$ stream can be at least about 90%, e.g., at least about 95%, of the pressure of the exhaust used as the input to the PSA system. Additionally or alternately, the pressure of the $H_2$ stream can differ from the separation pressure by less than about 0.5 bar (about 50 kPa), e.g., less than about 0.3 bar (about 30 kPa) or less than about 0.1 bar (about 10 kPa). Further additionally or alternately, the separation temperature for the portion of the exhaust stream introduced into the PSA reactor can differ from the temperature of the $H_2$ product stream by about 20° C. or less, e.g., by about 15° C. or less or by about 10° C. or less. It is noted that, although having the same temperature for the separation temperature and the temperature in the stream (i.e., a difference of approximately 0° C.) is included within the enumerated differences, in some rare embodiments the temperature differences can optionally exclude 0° C.

Figure 3:
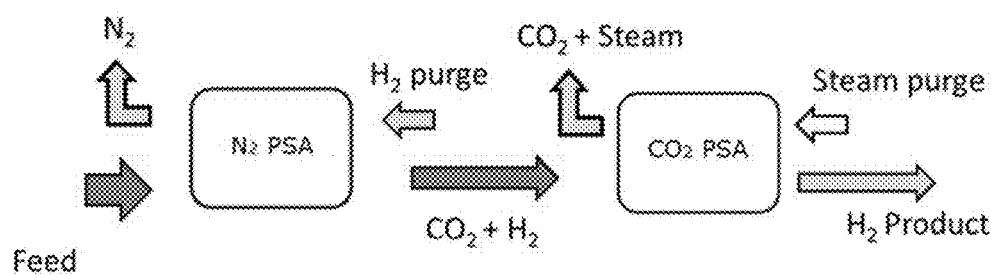
FIG. 3 schematically shows an alternative configuration for a pressure swing adsorption process for the production of N$_2$ and H$_2$.

FIG. 3 schematically shows an alternative embodiment of the disclosed method wherein the exhaust feed is first introduced to the $N_2$ swing adsorption reactor rather than the $CO_2$ swing adsorption reactor. It should be understood by those skilled in the art there is no requisite order in terms of which swing adsorption reactor the exhaust gas is fed to first. There may be situations where it is preferable to feed one reactor before the other—i.e. it may be advantageous to feed the $CO_2$ swing adsorption reactor first where the exhaust gas has a higher concentration of $CO_2$ or it may be advantageous to feed the $N_2$ swing adsorption reactor first where the exhaust gas has a higher concentration of $N_2$ or $NO_x$ species.

FIGS. 4a and 4b depict yet another alternative arrangement wherein the $CO_2$ swing adsorption reactor and the $N_2$ swing adsorption reactor are contained within a single vessel. As shown, the reactors can be annular in shape and arranged concentrically. Such an arrangement can be advantageous in off-shore or transport environments where space is at a premium. It is important to note that in such configurations, care must be taken so that there is no comingling of steam from the steam purge of the $CO_2$ adsorption process with the $N_2$ adsorption gases. As can be seen in FIGS. 4a and 4b, this concern is handled by isolating the steam purge header from $N_2$ adsorption process. The arrangement permits using the same configuration by reversing flow directions and sending feed to a preferred PSA depending on the feed composition. Feed gas is shown to pass in an upward direction merely for illustration, but can also pass in a downward direction in other cases. In these figures, packed beds of adsorbent materials, which may be structured or unstructured or combinations of these materials are arranged concentrically. Appropriate headers and manifolds are provided to take out enriched products and bring in purge streams.

FIG. 5 depicts yet another embodiment contemplated by the current disclosure. In FIG. 5, multiple (e.g. two) exhaust feeds from different sources are processed in separate trains of staged PSA's, whereby $CO_2$ PSA1 produces an enrichment in N2 and $N_2$ PSA2 produces an enrichment in CO2. The product streams (at high pressure) of the PSA's are cascaded as feed to the second stage of PSA's. The enrichments from the first stage of PSA increase the working capacity of the second stage of PSA's. Additionally the steam purge of the $CO_2$ PSA2 is subsequently passed through as purge for $CO_2$ PSA1, thus allowing maximum usage of steam before it is condensed to separate out $CO_2$. In tandem a small portion of purified high pressure $H_2$ product from the second stage $N_2$ PSA1 is expanded and used as purge in both $N_2$ PSA1 and $N_2$ PSA2.

Swing Adsorber Processes—Reactor Configuration

Beds of adsorbent can be arranged in any convenient manner to provide a flow path for gas, including axial and/or radial flow directions. The vessels holding the bed of adsorbent can be oriented with respect to flow direction in any convenient manner. One typical orientation for a PSA reactor can be to have a reactor where the direction of flow is aligned with the long or primary axis of the reactor. An example of this includes having PSA reactors in the form of vertical cylinders, where the input gas flow enters the cylinder through the top or bottom surface. While this can represent a conventional configuration for a PSA reactor relative to the direction of gas flow, scaling up a process to handle large flow volumes can pose difficulties. For example, a typical length to diameter ratio for a PSA reactor can be about 3 to 1, such as a reactor with a length of about 10 meters and a diameter of about 3 meters. Increasing the size of such a reactor can generally result in an increasing pressure drop across the reactor, which is typically not desirable. Thus, in order to scale up axial flow PSA reactors to handle large gas flows, multiple reactors can typically be used.

Additionally or alternatively, a PSA reactor can be used where the long or primary axis of the reactor can be perpendicular to the direction of gas flow. For example, a PSA reactor can include parallel plates of adsorbent with the long axis of the parallel plates being perpendicular to the direction of gas flow. This can allow a much larger volume of adsorbent for capturing $CO_2$ to be placed in a single reactor with an axial flow orientation while reducing the distance the gas flow must travel to cross the reactor. As a result, this type of configuration can reduce the pressure drop across a PSA reactor while still handling large volumes of input gas flow. This can reduce the number of separate reactors required to handle a large flow.

As an example, a horizontally oriented PSA reactor can have parallel plates of adsorbent of approximately rectangular shape, e.g., with a long axis of about 30 meters and a short axis of about 4 meters. In the horizontal configuration, the input gas can be introduced to flow across the short axis. This can be accomplished by introducing the input gas at several locations along a side of the reactor corresponding to the long axis. Flow distributors can then be used inside the PSA reactor so that the input gas can be distributed along the entire length of the long axis. For large gas flow rates, the pressure drop from distributing the feed across the long axis of a PSA reactor can be lower than attempting to force such a large gas flow rate through a plurality of conventional axial flow PSA reactors.

Swing Adsorber Processes—Adsorbent Materials

In various aspects, a swing adsorption process used to produce $CO_2$, $N_2$, and $H_2$ from an exhaust gas. For example, the exhaust gas can have a temperature from about 300° C. to about 600° C. (e.g., from about 300° C. to about 550° C., from about 300° C. to about 500° C., from about 300° C. to about 450° C., from about 300° C. to about 400° C., from about 350° C. to about 600° C., from about 350° C. to about 550° C., from about 350° C. to about 500° C., from about 350° C. to about 450° C., from about 400° C. to about 600° C., from about 400° C. to about 550° C., from about 400° C. to about 500° C., from about 425° C. to about 600° C., from about 425° C. to about 550° C., from about 425° C. to about 500° C., from about 425° C. to about 460° C., from about 450° C. to about 600° C., from about 450° C. to about 550° C., or from about 500° C. to about 600° C.; additionally or alternately, the temperature can be at least about 325° C., e.g., at least about 350° C., at least about 400° C., at least about 425° C., or at least about 440° C.; further additionally or alternately, the temperature can be about 575° C. or less, about 550° C. or less, about 500° C. or less, about 475° C. or less, about 460° C. or less, or about 440° C. or less) and a pressure from about 10 bara (about 1.0 MPaa) to about 60 bara (about 6.0 MPaa) (e.g., a pressure of at least about 10 bara (about 1.0 MPaa), at least about 15 bara (about 1.5 MPaa), at least about 20 bara (about 2.0 MPaa), at least about 25 bara (about 2.5 MPaa), or at least about 30 bara (about 3.0 MPaa) and/or a pressure of about 60 bara (6.0 MPaa) or less, about 50 bara (about 5.0 MPaa) or less, about 40 bara (about 4.0 MPaa) or less, about 35 bara (about 3.5 MPaa) or less, about 30 bara (about 3.0 MPaa) or less, about 25 bara (about 2.5 MPaa) or less, or about 22.5 bara (about 2.25 MPaa) or less).

As noted above, one goal of the separation process can be to perform the separation under conditions compatible with the power generation process. Thus, it can be desirable to perform the separation at approximately the temperature and pressure of the exhaust gas. In order to accomplish a separation at the conditions of the exhaust gas, the adsorbent material in the pressure swing adsorber reactor should generally be effective under such conditions.

$CO_2$ Adsorbent

One example of a suitable $CO_2$ adsorbent includes a mixed metal oxide adsorbent, such as an adsorbent including a mixture of an alkali metal carbonate and an alkaline earth metal oxide and/or a transition metal oxide. Examples of suitable alkali metal carbonates can include, but are not limited to, a carbonate of lithium, sodium, potassium, rubidium, cesium, or a combination thereof, e.g., a carbonate of lithium, sodium, potassium, or a combination thereof. Examples of suitable alkaline earth metal oxides can include, but are not limited to, oxides of magnesium, calcium, strontium, barium, or a combination thereof, e.g., oxides of magnesium and/or calcium. Some examples of suitable transition metal oxides can include, but are not limited to, oxides of lanthanide series metals, such as lanthanum, and/or of transition metals that can form oxides with the metal in a +2 or +3 oxidation state (such as yttrium, iron, zinc, nickel, vanadium, zirconium, cobalt, or a combination thereof).

In some aspects, the carbonate can be selected independently from the oxide in the mixed metal oxide. In such aspects, the carbonate can include, consist essentially of, or be lithium carbonate, sodium carbonate, potassium carbonate, rubidium carbonate, and/or cesium carbonate (e.g., lithium carbonate, sodium carbonate, and/or potassium carbonate; lithium carbonate and/or potassium carbonate; lithium carbonate and/or sodium carbonate; or sodium carbonate and/or potassium carbonate).

In aspects where the carbonate is selected independently from the oxide, the oxide can be an alkaline earth oxide, a transition metal oxide, a combination of two or more alkaline earth oxides, a combination of two or more transition metal oxides, or a combination of oxides including at least one alkaline earth oxide and at least one transition metal oxide. In aspects where the independently selected oxide includes one or more alkaline earth oxides, a suitable alkaline earth oxide can include, consist essentially of, or be magnesium oxide, calcium oxide, strontium oxide, and/or barium oxide, e.g., including at least magnesium oxide and/or calcium oxide.

In aspects where the independently selected oxide includes one or more transition metal oxides, suitable transition metals can include, consist essentially of, or be one or more transition metals that can form oxides with the metal in a +2 or +3 oxidation state (e.g., yttrium oxide, iron oxide, zinc oxide, nickel oxide, vanadium oxide, cobalt oxide, zirconium oxide, lanthanum oxide, other oxides of lanthanide metals, and/or a combination thereof). One preferred option includes a transition metal oxide selected from lanthanum oxide and/or zirconium oxide. Another option includes a metal oxide selected from lanthanum oxide, yttrium oxide, zirconium oxide, and/or zinc oxide. Yet another option includes a metal oxide selected from nickel oxide, cobalt oxide, and/or iron oxide. Mixtures within each of these options and/or across options are also contemplated, such as mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and mixtures of zirconium oxide with iron oxide, cobalt oxide, and/or nickel oxide.

In aspects where the independently selected oxide includes one or more alkali metal oxides and one or more transition metal oxides, suitable alkali metal oxides can include, consist essentially of, or be magnesium oxide, calcium oxide, strontium oxide, and/or barium oxide, while suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, and/or other lanthanide oxides. Each of these alkali metal oxides and transition metal oxides can be independently selected individually or in any combination of multiple transition metal oxides. Examples of mixtures can include, consist essentially of, or be a mixture of oxides where at least one oxide is lanthanum oxide, zirconium oxide, and/or magnesium oxide; a mixture of oxides where the mixture includes at least two of lanthanum oxide, zirconium oxide, and magnesium oxide; a mixture of oxides where one oxide is magnesium oxide and/or calcium oxide; and/or a mixture of oxides where at least one oxide is lanthanum oxide, yttrium oxide, and/or zirconium oxide.

In some alternative aspects, a mixed metal oxide can include an alkaline earth carbonate in combination with a transition metal oxide. In such aspects, the alkaline earth carbonate can include, consist essentially of, or be magnesium carbonate and/or calcium carbonate. Additionally or alternately, the alkaline earth carbonate can be present in a mixture with an alkali metal carbonate. Examples of such carbonate mixtures can include, consist essentially of, or be mixtures of lithium carbonate with magnesium carbonate, lithium carbonate with calcium carbonate, potassium carbonate with magnesium carbonate, potassium carbonate with calcium carbonate, sodium carbonate with magnesium carbonate, and sodium carbonate with calcium carbonate (e.g., lithium carbonate with magnesium carbonate or potassium carbonate with magnesium carbonate). In such aspects, suitable transition metals can include, consist essentially of, or be transition metals that can form oxides with the metal in a +2 or +3 oxidation state, such as yttrium oxide, iron oxide, zinc oxide, nickel oxide, vanadium oxide, cobalt oxide, zirconium oxide, lanthanum oxide, other lanthanide oxides, and/or a combination thereof. Each of these alkaline earth carbonates and transition metal oxides can be independently selected individually or in any combination of multiple alkaline earth carbonates and/or multiple transition metal oxides. For the transition metal oxide, one preferred option can include a transition metal oxide selected from lanthanum oxide or zirconium oxide. Another option can include a metal oxide selected from lanthanum oxide, yttrium oxide, zirconium oxide, and/or zinc oxide. Yet another option can include a metal oxide selected from nickel oxide, cobalt oxide, and/or iron oxide. Mixtures within each of these options and/or across options are also contemplated, such as mixtures of oxides where at least one oxide is lanthanum oxide and/or zirconium oxide; mixtures of lanthanum oxide with zinc oxide and/or vanadium oxide; mixtures of lanthanum oxide with iron oxide, cobalt oxide, and/or nickel oxide; mixtures of zirconium oxide with yttrium oxide, zinc oxide, and/or vanadium oxide; and/or mixtures of zirconium oxide with iron oxide, cobalt oxide, and/or nickel oxide.

Additional or alternative materials can include hydrotalcites.

$N_2$ Adsorbent

The $N_2$ adsorbent used in the $N_2$ swing adsorption reactor can be any adsorbent selective for $N_2$ over $CO_2$ and $H_2$. In particular, the $N_2$ adsorbent may comprise titanosilicates or the composition ITQ-55 described in U.S. patent application Ser. No. 14/744,169 (published as US 2016/0009563), which is incorporated herein by reference. Other nitrogen selective crystalline zeolites include either CTS-1 zeolites described and claimed in the U.S. patent application Ser. No. 09/210,631, filed Dec. 11, 1998, now U.S. Pat. No. 6,068,682, or barium exchanged ETS-4 described and claimed in the U.S. patent application Ser. No. 08/996,298, filed Dec. 22, 1997, now U.S. Pat. No. 5,989,316, or 4A or 3A zeolite.

The CTS-1 zeolites are characterized as having a pore size of approximately 3-4 Angstrom units and a composition in terms of mol ratios or oxide as follows:

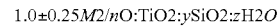

$$1.0\pm0.25 M2/nO:TiO2:ySiO2:zH2O$$

wherein M is at least one cation having a valence n, y is from 1.0 to 100 and z is from 0 to 100, said zeolite being characterized by the following X-ray diffraction pattern.

| D-spacings (Angstroms) | I/I0 |
| --- | --- |
| 11.3 ± 0.25 | Very Strong |
| 6.6 ± 0.2 | Medium-Strong |
| 4.3 ± 0.15 | Medium-Strong |
| 3.3 ± 0.1 | Medium-Strong |
| 2.85 ± 0.05 | Medium-Strong | wherein very strong equals 100, medium-strong equals 15-80.

Barium ETS-4 is ETS-4 which has been exchanged with barium such that barium represents at least 30% of the exchangeable cations of ETS-4.

Other Embodiments

Additionally or alternately, the present invention can include one or more of the following embodiments.

Embodiment 1. A method for production of $H_2$, $N_2$, and $CO_2$ from an exhaust stream, comprising: passing an exhaust stream comprising at least about 40-80 vol % $N_2$, at least about 5-30 vol % $CO_2$, and at least about 1-20% $H_2$ into a $CO_2$ swing adsorption reactor comprising a $CO_2$ adsorbent material selective for $CO_2$ over $N_2$ and $H_2$, the exhaust stream having a pressure between about 10 bara (about 1.0 MPaa) to about 30 bara (about 3.0 MPaa); adsorbing $CO_2$ on the $CO_2$ adsorbent material; recovering a $N_2$ and $H_2$ stream from a forward end of the $CO_2$ swing adsorption reactor, the recovered $N_2$ and $H_2$ stream having a pressure that differs from the pressure of the exhaust stream by about 0.5 bara (about 50 kPa) or less; reducing the pressure in the $CO_2$ swing adsorption reactor to a pressure from about 1.0 bara (about 0.1 MPaa) to about 4.0 bara (about 0.4 MPaa) by outputting a blow down stream from at least one end of the $CO_2$ swing adsorption reactor; and purging the $CO_2$ swing adsorption reactor with a steam purge at a pressure from about 1.0 bara (about 0.1 MPaa) to about 4.0 bara (about 0.4 MPaa) to generate a $CO_2$ recovery stream, the $CO_2$ recovery stream comprising at least about 90% of the $CO_2$ present in the exhaust stream, the steam purge containing less than about 1.0 moles of $H_2O$ per mole of $CO_2$ in the reactor exhaust stream; passing the $N_2$ and $H_2$ stream into a $N_2$ swing adsorption reactor comprising a $N_2$ adsorbent material selective for $N_2$ over $CO_2$ and $H_2$; adsorbing $N_2$ on the $N_2$ adsorbent material; recovering an $H_2$ stream having a purity of at least 95% from a forward end of the $N_2$ swing adsorption reactor, the recovered $H_2$ stream having a pressure that differs from the pressure of the $N_2$ and $H_2$ stream by about 0.5 bara (about 50 kPa) or less; reducing the pressure in the $N_2$ swing adsorption reactor to a pressure from about 1.0 bara (about 0.1 MPaa) to about 4.0 bara (about 0.4 MPaa) by outputting a blow down stream from at least one end of the $N_2$ swing adsorption reactor; and purging the $N_2$ swing adsorption reactor with a portion of the $H_2$ stream at a pressure from about 1.0 bara (about 0.1 MPaa) to about 4.0 bara (about 0.4 MPaa) to generate a $N_2$ recovery stream, the $N_2$ recovery stream comprising at least about 90% of the $N_2$ present in the exhaust stream.

Embodiment 2. The method of embodiment 1, wherein the exhaust stream is passed to the $CO_2$ swing adsorption reactor before the $N_2$ swing adsorption reactor.

Embodiment 3. The method of embodiment 1, wherein the exhaust stream is passed to the $N_2$ swing adsorption reactor before the $CO_2$ swing adsorption reactor.

Embodiment 4. The method of any of the previous embodiments, further comprising repressurizing the $CO_2$ swing adsorption reactor to a pressure of at least about 10 bara (about 1.0 MPaa) with the exhaust stream.

Embodiment 5. The method of any of the previous embodiments, wherein the exhaust stream comprises a power plant flue stream, a refinery flue stream, or a combination thereof.

Embodiment 6. The method of any of the previous embodiments, wherein the exhaust stream is generated by combustion of a fuel in a reducing atmosphere.

Embodiment 7. The method of any of the previous embodiments, wherein the steam purge contains less than 0.8 moles of $H_2O$ per mole of $CO_2$ in the exhaust stream.

Embodiment 8. The method of any of the previous embodiments, wherein the exhaust gas has an exhaust temperature from about 400° C. to about 500° C.

Embodiment 9. The method of any of the previous embodiments, wherein the $CO_2$ swing adsorption reactor and the $N_2$ swing adsorption reactor respectively have a $CO_2$ and $N_2$ adsorption temperature that differs from the exhaust temperature by 20° C.

Embodiment 10. The method of any of the previous embodiments, wherein the $CO_2$ adsorbent material comprises an alkali metal carbonate and an oxide of an alkaline earth metal or a transition metal.

Embodiment 11. The method of any of the previous embodiments, wherein the $N_2$ adsorbent material is a zeolite comprising at least one of (i) a CTS-1 zeolite, (ii) a ETS-4 zeolite, (iii) ITQ-55; (iv) 4A zeolite, or (v) 3A zeolite.

Embodiment 12. The method of any of the previous embodiments, wherein the $CO_2$ swing adsorption reactor and the $N_2$ swing adsorption reactor are arranged concentrically within a single vessel.

Embodiment 13. The method of any of the previous embodiments, wherein the steam purge is fed to a second $CO_2$ swing adsorption reactor.

Embodiment 14. The method of any of the previous embodiments, wherein the $H_2$ purge is fed to a second $N_2$ swing adsorption reactor.

Although the present invention has been described in terms of specific embodiments, it need not necessarily be so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for production of $H_2$, $N_2$, and $CO_2$ from an exhaust stream, comprising:

passing an exhaust stream comprising at least about 40-80 vol % $N_2$, at least about 5-30 vol % $CO_2$, and at least about 1-20% $H_2$ into a $CO_2$ swing adsorption reactor comprising a $CO_2$ adsorbent material selective for $CO_2$ over $N_2$ and $H_2$, the exhaust stream having a pressure between about 10 bara (about 1.0 MPaa) to about 30 bara (about 3.0 MPaa), wherein the exhaust stream comprising a power plant flue stream, a refinery flue stream, or a combination thereof;

adsorbing $CO_2$ on the $CO_2$ adsorbent material;

recovering a $N_2$ and $H_2$ stream from a forward end of the $CO_2$ swing adsorption reactor, the recovered $N_2$ and $H_2$ stream having a pressure that differs from the pressure of the exhaust stream by about 0.5 bara (about 50 kPa) or less;

reducing the pressure in the $CO_2$ swing adsorption reactor to a pressure from about 1.0 bara (about 0.1 MPaa) to about 4.0 bara (about 0.4 MPaa) by outputting a blow down stream from at least one end of the $CO_2$ swing adsorption reactor; and purging the $CO_2$ swing adsorption reactor with a steam purge at a pressure from about 1.0 bara (about 0.1 MPaa) to about 4.0 bara (about 0.4 MPaa) to generate a $CO_2$ recovery stream, the $CO_2$ recovery stream comprising at least about 90% of the $CO_2$ present in the exhaust stream, the steam purge containing less than about 1.0 moles of $H_2O$ per mole of $CO_2$ in the reactor exhaust stream;

passing the $N_2$ and $H_2$ stream into a $N_2$ swing adsorption reactor comprising a $N_2$ adsorbent material selective for $N_2$ over $CO_2$ and $H_2$;

adsorbing $N_2$ on the $N_2$ adsorbent material;

recovering an $H_2$ stream having a purity of at least 95% from a forward end of the $N_2$ swing adsorption reactor, the recovered $H_2$ stream having a pressure that differs from the pressure of the $N_2$ and $H_2$ stream by about 0.5 bara (about 50 kPa) or less;

reducing the pressure in the $N_2$ swing adsorption reactor to a pressure from about 1.0 bara (about 0.1 MPaa) to about 4.0 bara (about 0.4 MPaa) by outputting a blow down stream from at least one end of the $N_2$ swing adsorption reactor; and purging the $N_2$ swing adsorption reactor with a portion of the $H_2$ stream at a pressure from about 1.0 bara (about 0.1 MPaa) to about 4.0 bara (about 0.4 MPaa) to generate a $N_2$ recovery stream, the $N_2$ recovery stream comprising at least about 90% of the $N_2$ present in the exhaust stream.

2. The method of claim 1, further comprising repressurizing the $CO_2$ swing adsorption reactor to a pressure of at least about 10 bara (about 1.0 MPaa) with the exhaust stream.

3. The method of claim 1, wherein the exhaust stream is generated by combustion of a fuel in a reducing atmosphere.

4. The method of claim 1, wherein the steam purge contains less than 0.8 moles of $H_2O$ per mole of $CO_2$ in the exhaust stream.

5. The method of claim 1, wherein the exhaust gas has an exhaust temperature from about 400° C. to about 500° C.

6. The method of claim 5, wherein the $CO_2$ swing adsorption reactor and the $N_2$ swing adsorption reactor respectively have a $CO_2$ and $N_2$ adsorption temperature that differs from the exhaust temperature by 20° C.

7. The method of claim 1, wherein the $CO_2$ adsorbent material comprises an alkali metal carbonate and an oxide of an alkaline earth metal or a transition metal.

8. The method of claim 1, wherein the $N_2$ adsorbent material is a zeolite comprising at least one of (i) a CTS-1 zeolite, (ii) a ETS-4 zeolite, (iii) ITQ-55; (iv) 4A zeolite, or (v) 3A zeolite.

9. The method of claim 1, wherein the $CO_2$ swing adsorption reactor and the $N_2$ swing adsorption reactor are arranged concentrically within a single vessel.

10. The method of claim 1, wherein the steam purge is fed to a second $CO_2$ swing adsorption reactor.

11. The method of claim 1, wherein the $H_2$ purge is fed to a second $N_2$ swing adsorption reactor.

\* \* \* \* \*